US008970732B2

(12) United States Patent
Yoshida

(10) Patent No.: US 8,970,732 B2

(45) Date of Patent: Mar. 3, 2015

(54) IMAGE CAPTURE APPARATUS AND METHOD OF CONTROLLING THE SAME

(71) Applicant: Canon Kabushiki Kaisha, Tokyo (JP)

(72) Inventor: Akimitsu Yoshida, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 13/951,640

(22) Filed: Jul. 26, 2013

(65) Prior Publication Data

US 2013/0308009 A1 Nov. 21, 2013

Related U.S. Application Data

(63) Continuation of application No. PCT/JP2013/002445, filed on Apr. 10, 2013.

(30) Foreign Application Priority Data

Apr. 11, 2012 (JP) ................................ 2012-090595
Apr. 3, 2013 (JP) ................................ 2013-078098

(51) Int. Cl.
*H04N 5/235* (2006.01)
*H04N 5/243* (2006.01)
*H04N 101/00* (2006.01)

(52) U.S. Cl.
CPC ............ *H04N 5/243* (2013.01); *H04N 2101/00* (2013.01)
USPC ...................... 348/229.1; 348/221.1; 348/254

(58) Field of Classification Search
None
See application file for complete search history.

(56) References Cited

U.S. PATENT DOCUMENTS

| | | | | |
|---|---|---|---|---|
| 7,646,411 | B2 * | 1/2010 | Igarashi | 348/254 |
| 8,483,507 | B2 * | 7/2013 | Kubota | 382/274 |
| 8,791,961 | B2 * | 7/2014 | Ozawa et al. | 345/636 |
| 2008/0100858 | A1 * | 5/2008 | Kondo | 358/1.9 |
| 2009/0066816 | A1 * | 3/2009 | Wakagi et al. | 348/234 |
| 2010/0079617 | A1 * | 4/2010 | Kosaka | 348/229.1 |
| 2010/0201843 | A1 * | 8/2010 | Fukui | 348/229.1 |
| 2011/0187905 | A1 * | 8/2011 | Sugimoto et al. | 348/254 |

FOREIGN PATENT DOCUMENTS

| | | | |
|---|---|---|---|
| JP | 11-331689 | A | 11/1999 |
| JP | 2003-230052 | A | 8/2003 |
| JP | 2006-157658 | A | 6/2006 |
| WO | 2007/108317 | A1 | 9/2007 |

* cited by examiner

*Primary Examiner* — Twyler Haskins
*Assistant Examiner* — Wesley J Chiu
(74) *Attorney, Agent, or Firm* — Cowan, Liebowitz & Latman, P.C.

(57) ABSTRACT

There are provided an image capture apparatus which can implement good tone gradation at various shooting sensitivities without preparing a nonlinear conversion characteristic for each shooting sensitivity, and a method of controlling the apparatus. If the shooting sensitivity is less than the standard sensitivity, nonlinear conversion processing is performed by linearly converting the range of signal levels obtained by shooting operation with an image sensor sensitivity corresponding to the standard sensitivity such that the maximum value decreases with a decrease in shooting sensitivity.

7 Claims, 9 Drawing Sheets

OUTPUT
LOG GAMMA
255
204
ISO400
ISO200
INPUT
2047
4095

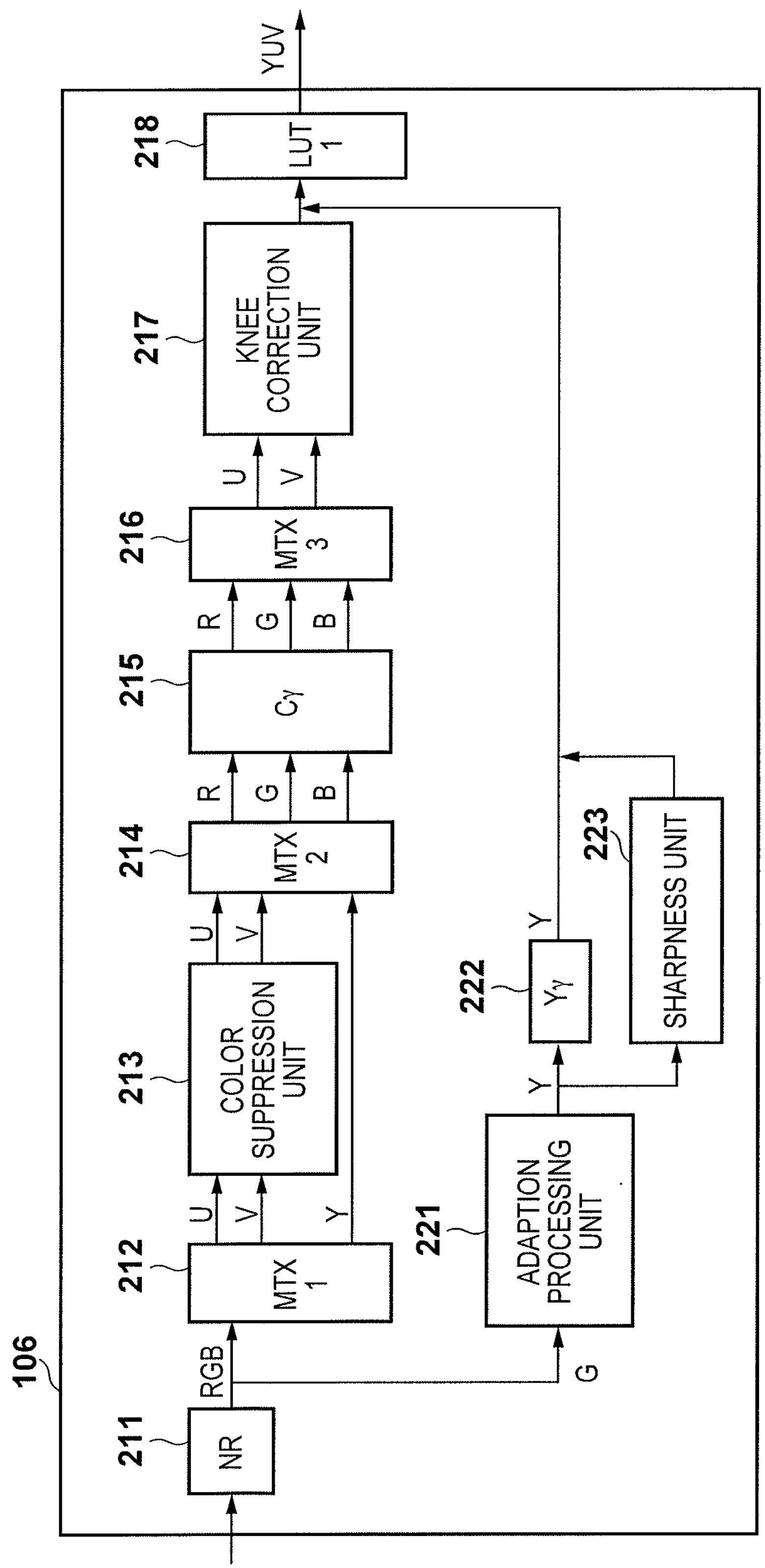
F I G. 2B
106
211
NR
RGB
G
212
MTX 1
U
V
Y
213
COLOR SUPPRESSION UNIT
U
V
214
MTX 2
R
G
B
215
Cγ
R
G
B
216
MTX 3
U
V
217
KNEE CORRECTION UNIT
218
LUT 1
YUV
221
ADAPTION PROCESSING UNIT
Y
222
Yγ
Y
223
SHARPNESS UNIT

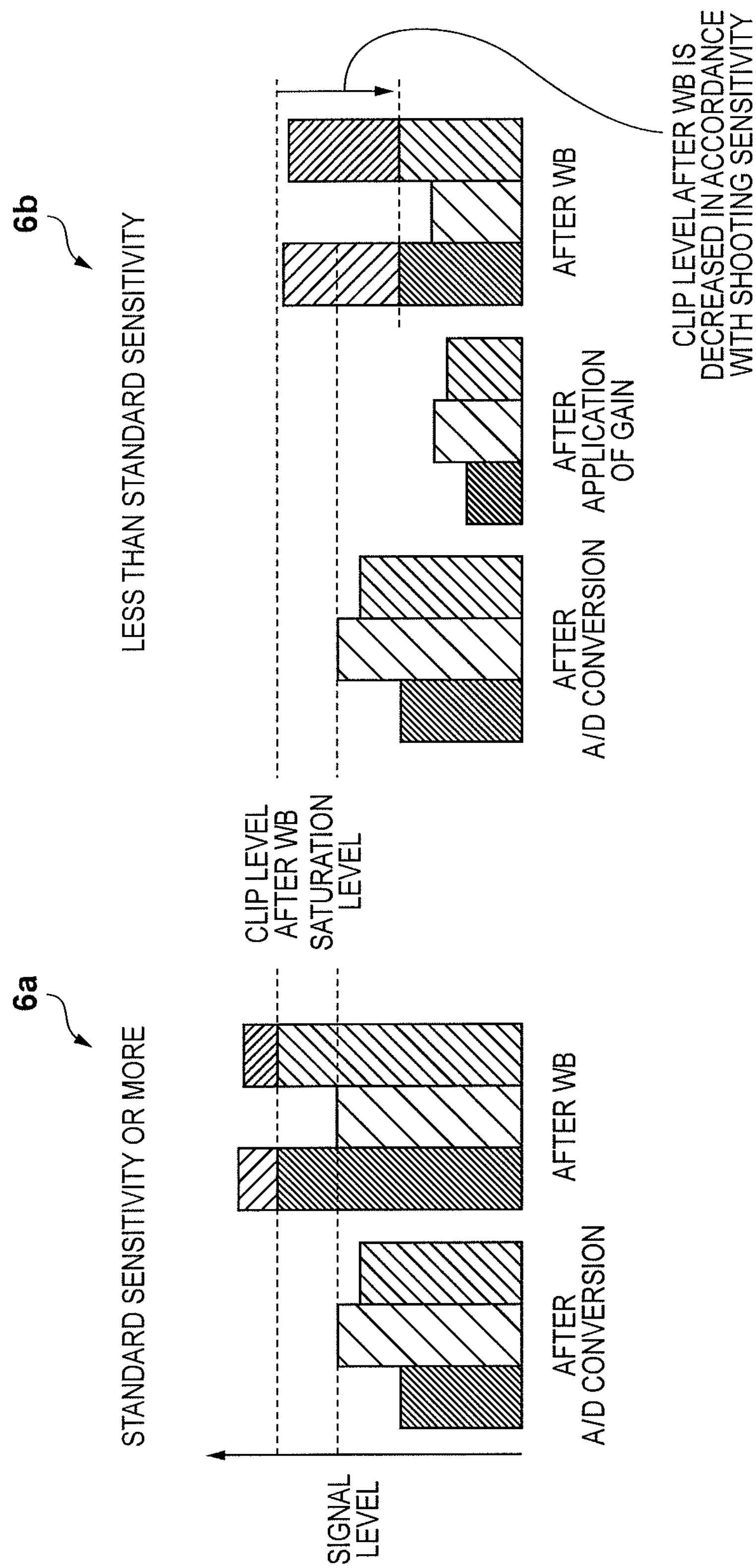
F I G. 6
6a
STANDARD SENSITIVITY OR MORE
6b
LESS THAN STANDARD SENSITIVITY
SIGNAL LEVEL
CLIP LEVEL AFTER WB
SATURATION LEVEL
AFTER A/D CONVERSION
AFTER WB
AFTER A/D CONVERSION
AFTER APPLICATION OF GAIN
AFTER WB
CLIP LEVEL AFTER WB IS DECREASED IN ACCORDANCE WITH SHOOTING SENSITIVITY F I G. 7
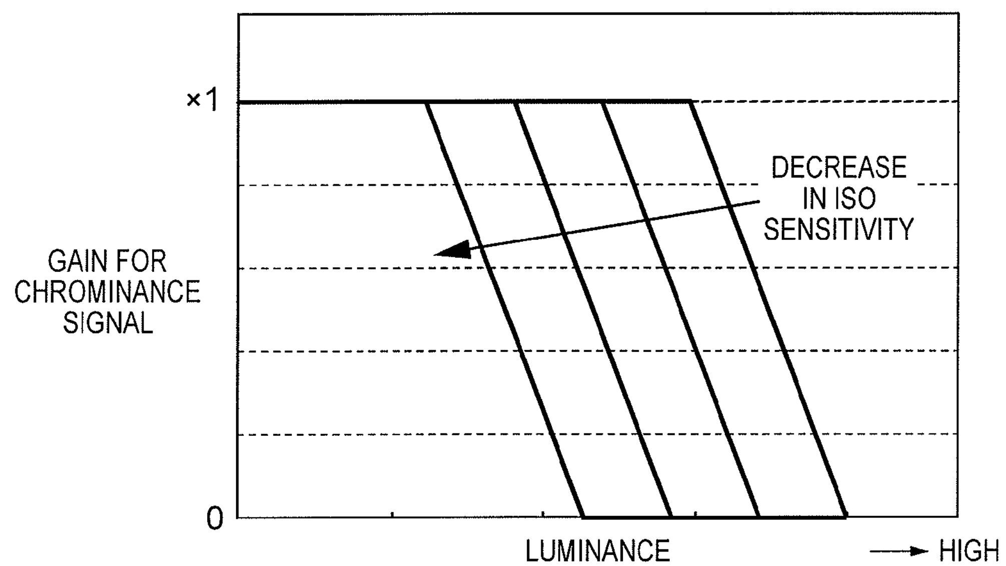

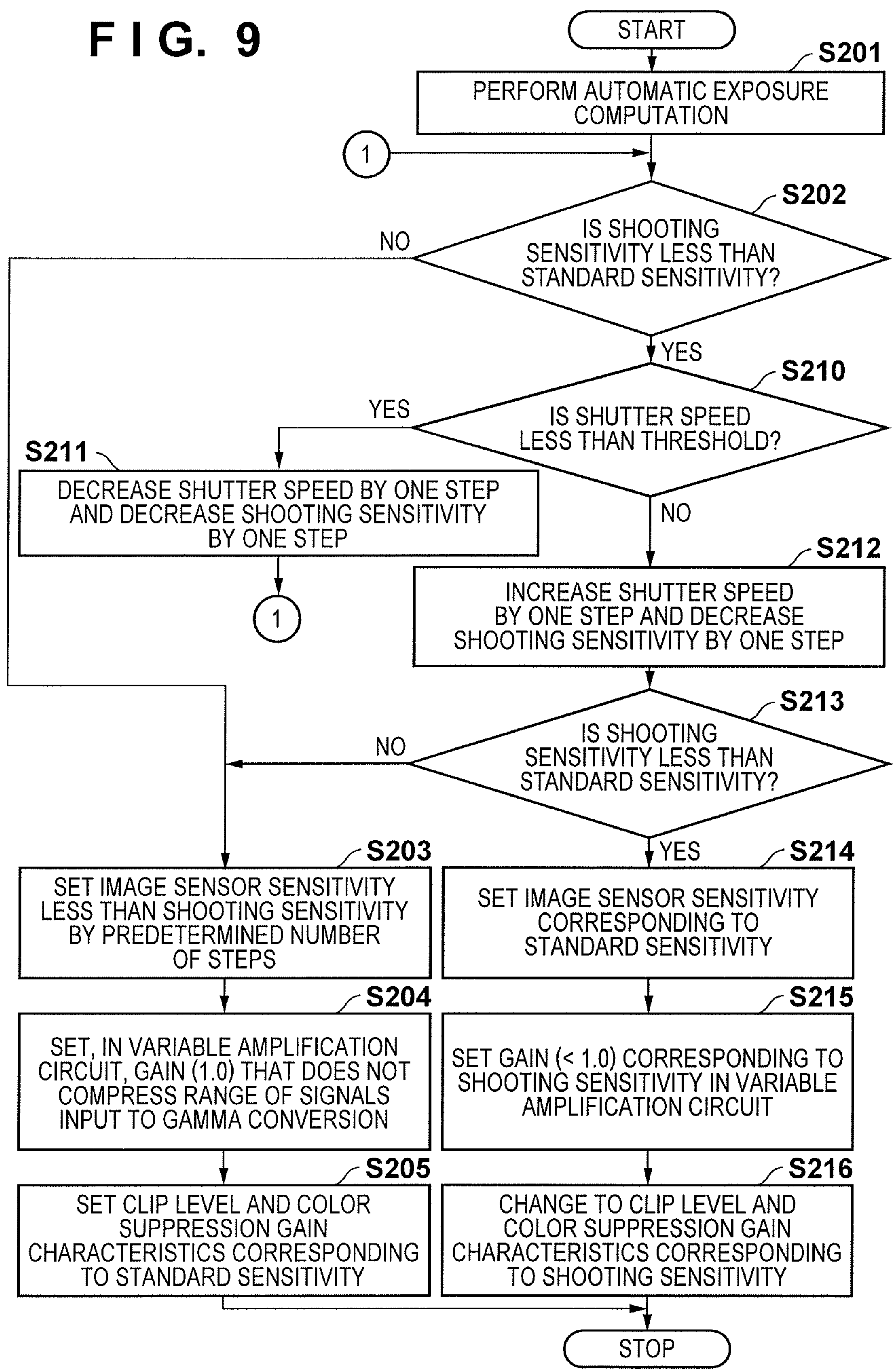
F I G. 9
START
S201
PERFORM AUTOMATIC EXPOSURE COMPUTATION
1
S202
IS SHOOTING SENSITIVITY LESS THAN STANDARD SENSITIVITY?
NO
YES
S210
IS SHUTTER SPEED LESS THAN THRESHOLD?
YES
S211
DECREASE SHUTTER SPEED BY ONE STEP AND DECREASE SHOOTING SENSITIVITY BY ONE STEP
1
NO
S212
INCREASE SHUTTER SPEED BY ONE STEP AND DECREASE SHOOTING SENSITIVITY BY ONE STEP
S213
IS SHOOTING SENSITIVITY LESS THAN STANDARD SENSITIVITY?
NO
YES
S203
SET IMAGE SENSOR SENSITIVITY LESS THAN SHOOTING SENSITIVITY BY PREDETERMINED NUMBER OF STEPS
S214
SET IMAGE SENSOR SENSITIVITY CORRESPONDING TO STANDARD SENSITIVITY
S204
SET, IN VARIABLE AMPLIFICATION CIRCUIT, GAIN (1.0) THAT DOES NOT COMPRESS RANGE OF SIGNALS INPUT TO GAMMA CONVERSION
S215
SET GAIN (< 1.0) CORRESPONDING TO SHOOTING SENSITIVITY IN VARIABLE AMPLIFICATION CIRCUIT
S205
SET CLIP LEVEL AND COLOR SUPPRESSION GAIN CHARACTERISTICS CORRESPONDING TO STANDARD SENSITIVITY
S216
CHANGE TO CLIP LEVEL AND COLOR SUPPRESSION GAIN CHARACTERISTICS CORRESPONDING TO SHOOTING SENSITIVITY
STOP

IMAGE CAPTURE APPARATUS AND METHOD OF CONTROLLING THE SAME

BACKGROUND OF THE INVENTION

1. Field of the Invention

The present invention relates to an image capture apparatus and a method of controlling the same.

2. Description of the Related Art

An image capture apparatus such as a digital camera or a cellular phone with a camera is designed to set a gain for an output from an image sensor so as to exploit a range, of the input-output characteristics of the image sensor, which exhibits linearity (Japanese Patent Laid-Open No. 11-331689). This apparatus is provided with a linear conversion circuit (also called a gain circuit) which converts an output from the image sensor with a constant gain exhibiting linear input-output characteristics. The apparatus is also provided with a nonlinear conversion circuit (also called a gamma circuit) which converts the level of an image signal with a nonlinear input-output characteristic so as to control tone characteristics. For example, Japanese Patent Laid-Open No. 2006-157658 discloses a technique of performing tone correction by adjusting the input-output characteristics (also called gamma characteristics or gamma curve) of a nonlinear conversion circuit.

In order to ensure a dynamic range, the image sensor is sometimes driven with a constant sensitivity less than the set sensitivity to perform shooting operation regardless of the set sensitivity as in a case of driving the image sensor with a sensitivity less than the set shooting sensitivity. In this case, preparing a gamma curve for each sensitivity can compensate for the difference between the shooting sensitivity and the actual device driving sensitivity and exploit the input range of a gamma curve, thereby obtaining good tone gradation (Japanese Patent Laid-Open No. 2006-157658). FIG. 3 shows an example of a gamma curve corresponding to each shooting sensitivity.

However, preparing a gamma curve for each shooting sensitivity as shown in FIG. 3 will require a large storage capacity. The larger the number of shooting sensitivities which can be set, the more serious this problem will be. Some digital cameras are configured to set shooting sensitivities by an automatic exposure control function as well as allowing the user to explicitly set shooting sensitivities. In general, in many digital cameras, shooting sensitivities which can be set by the user are limited to values that change by 2 or ½ times like film speeds. However, shooting sensitivities which can be set by the automatic exposure control function can be values set in smaller steps. This is because the shooting sensitivities of a digital camera can be electrically controlled unlike film speeds.

In an image capture apparatus having an automatic exposure control function of deciding a shooting sensitivity, since the number of types of shooting sensitivities which can be set can be very large, the demerit of preparing a gamma curve for each shooting sensitivity further increases.

SUMMARY OF THE INVENTION

The present invention provides an image capture apparatus which can implement good tone gradation at various shooting sensitivities without preparing nonlinear conversion characteristics for each shooting sensitivity, and a method of controlling the apparatus.

According to an aspect of the present invention, there is provided an image capture apparatus comprising: a linear conversion unit that converts a signal level of a signal output from an image sensor with linear input-output characteristics and outputs a first converted signal; a nonlinear conversion unit that converts the signal level of the first converted signal with nonlinear input-output characteristics and outputs a second converted signal; and a control unit that controls operation of the linear conversion unit, wherein if a shooting sensitivity is less than a standard sensitivity, the standard sensitivity being a lowest shooting sensitivity which ensures a predetermined dynamic range, the control unit controls the linear input-output characteristics so as to convert a range of signal levels, obtained by shooting operation with an image sensor sensitivity corresponding to the standard sensitivity, such that a maximum value of the range decreases with a decrease in shooting sensitivity.

In addition, according to another aspect of the present invention, there is provided a method of controlling an image capture apparatus including a linear conversion unit that converts a signal level of a signal output from an image sensor with linear input-output characteristics and outputs a first converted signal and a nonlinear conversion unit that converts the signal level of the first converted signal with nonlinear input-output characteristics and outputs a second converted signal, the method comprising: a control step of, if a shooting sensitivity is less than a standard sensitivity, the standard sensitivity being a lowest shooting sensitivity which ensures a predetermined dynamic range, the control unit controls the linear input-output characteristics so as to convert a range of signal levels, obtained by shooting operation with an image sensor sensitivity corresponding to the standard sensitivity, such that a maximum value of the range decreases with a decrease in shooting sensitivity.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate exemplary embodiments of the invention and, together with the description, serve to explain the principles of the present invention.

FIG. 2B is a block diagram showing the details of an image processing unit in FIG. 1;

FIG. 6 is a view for explaining setting processing for clip levels corresponding to shooting sensitivities in the first embodiment of the present invention;

FIG. 7 is a view for explaining setting processing for color suppression gain characteristics corresponding to shooting sensitivities in the first embodiment of the present invention;

FIG. 9 is a flowchart for explaining the operation of a controller in the second embodiment of the present invention.

DESCRIPTION OF THE EMBODIMENTS

The exemplary embodiments of the present invention will be described below with reference to the accompanying drawings.

(First Embodiment)

Figure 1:
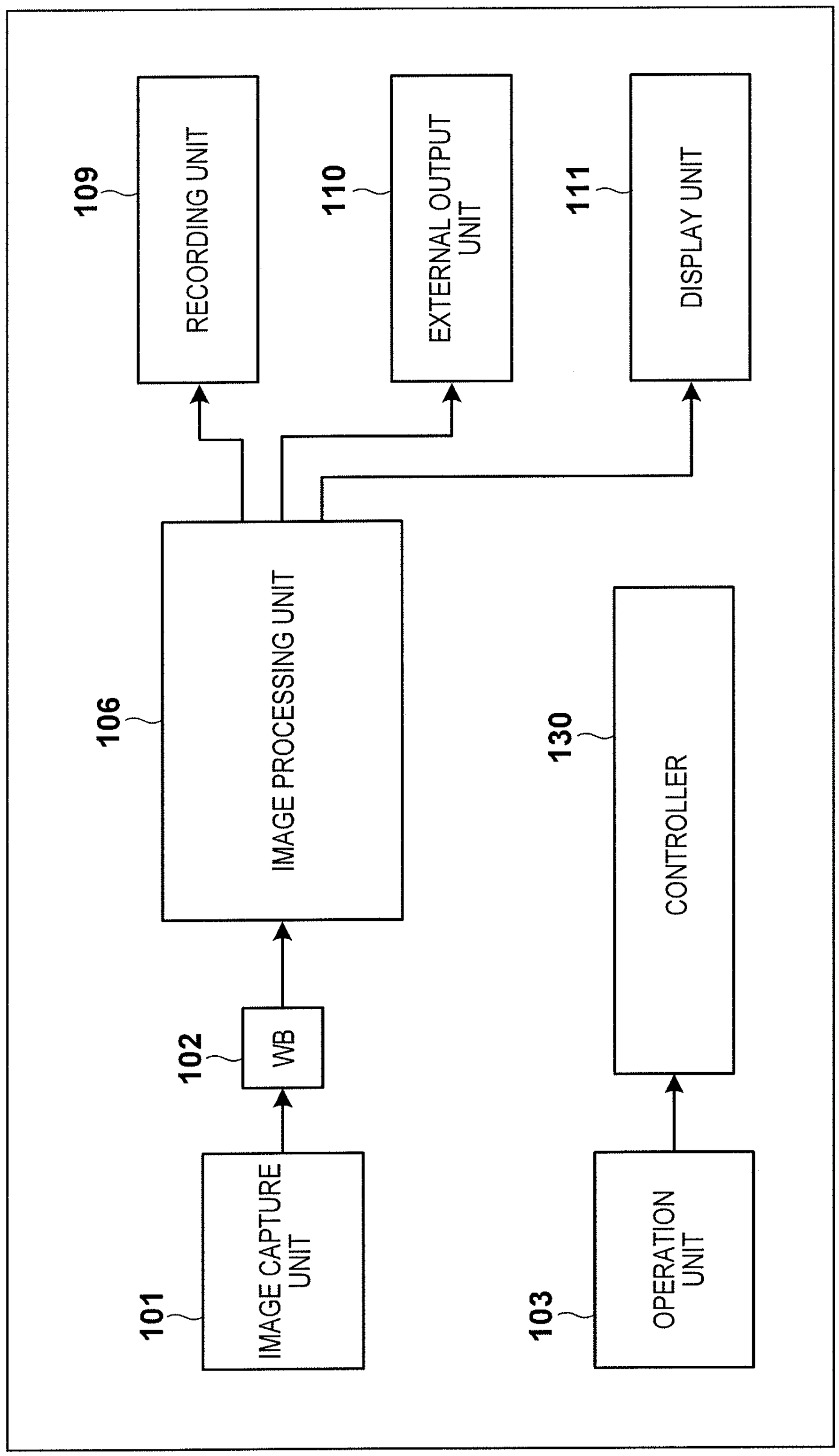
FIG. 1 is a block diagram showing an example of the arrangement of a digital still camera as an example of an image capture apparatus according to an embodiment of the present invention.

FIG. 1 is a block diagram showing an example of the arrangement of image capturing, developing, and outputting in a digital still camera 100 (to be simply referred to as a digital camera hereinafter) as an example of an image capture apparatus according to an embodiment of the present invention. A controller 130 includes a CPU and memories such as a ROM and a RAM. The controller 130 controls each unit described below and implements part or all of the function of each unit. Note that at least part of the arrangement described below may be implemented by the CPU of the controller 130 in a software manner, or hardware, or cooperation between hardware and software.

Note that this embodiment will exemplify a case in which the present invention is applied to an image capture apparatus which can perform movie shooting to which so-called Log gamma is applied. Log gamma is nonlinear input-output characteristics used for shooting operation premised on being subjected to editing as in the case of movies and television, and has characteristics with importance being attached to tone gradation to minimize blown-out highlights and blocked-up shadows so as to ensure an adjustable range at the time of editing. Log gamma is nonlinear input-output characteristics with which an output luminance logarithmically increases with an increase in input luminance value.

Figure 2A:
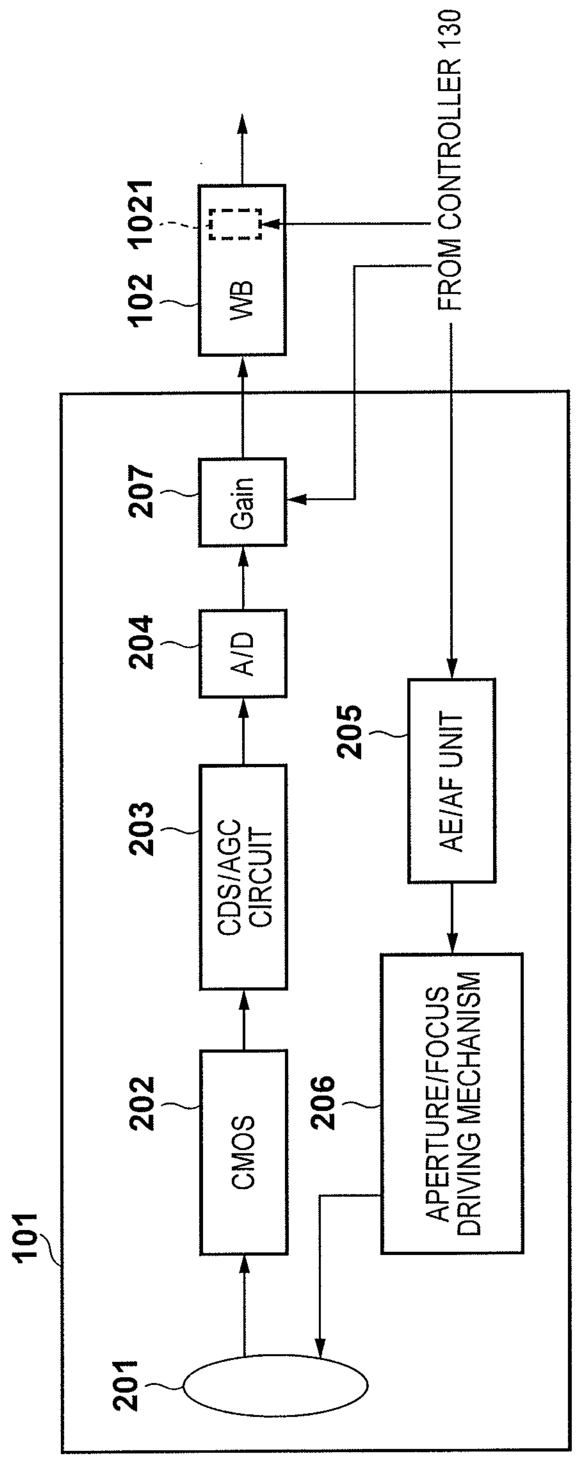
FIG. 2A is a block diagram showing the details of an image capture unit in FIG. 1.

An image capture unit 101 includes an imaging optical system and an image sensor. The image capture unit 101 converts an optical image formed on the image capture plane of the image sensor into an electrical signal, converts the acquired electrical signal into a digital signal, and outputs it. FIG. 2A shows an example of the arrangement of the image capture unit 101. Referring to FIG. 2A, an imaging optical system 201 forms an object image in its field of view (image capture range) onto the image capture plane of a CMOS 202 as an image sensor. Note that the image sensor to be used is not limited to a CMOS image sensor and may be another type of photoelectric conversion device such as a CCD image sensor.

A CDS/AGC circuit 203 performs gain adjustment while performing correlated double sampling of the electrical signals obtained from the CMOS 202. An A/D converter 204 digitally converts the signal output from the CDS/AGC circuit 203 and outputs the resultant signal as an image signal. A variable amplification circuit (Gain) 207 converts the levels of an output signal by applying input-output characteristics (gain) set by the controller 130 (to be described later) to an output from the A/D converter 204. The imaging optical system 201 includes a driving mechanism 206 for an aperture and a focus lens. An AE/AF unit 205 controls the driving mechanism 206 in accordance with an instruction from the controller 130. The AE/AF unit 205 and the driving mechanism 206 implement an automatic focus detection (AF) function and an automatic exposure control (AE) function.

Assume that the digital still camera 100 of this embodiment has an aperture priority AE mode, a shutter speed priority AE mode, and a program AE mode as automatic exposure control functions. Assume also that the user can make settings to determine whether the automatic exposure control function is allowed to decide a shooting sensitivity. An arrangement configured to allow such an AE mode and automatic exposure control function to decide a shooting sensitivity is known, and the details of the arrangement are irrelevant to the present invention. For this reason, a further description will be omitted.

Referring back to FIG. 1, a WB unit 102 performs white balance adjustment for the image signal output from the image capture unit 101 (variable amplification circuit 207). The WB unit 102 includes a clip circuit 1021 which limits the maximum level of a white balance adjusted signal to a clip level. The controller 130 sets a clip level. The image signal whose white balance is adjusted by the WB unit 102 is supplied to an image processing unit 106. The detailed operation of the image processing unit 106 will be described later.

An operation unit 103 is an input device group including switches, buttons, keys, dial, touch panel with which the user inputs various types of settings and instructions to the digital still camera 100. Note that the operation unit 103 may use line-of-sight detection, speech recognition, and the like in addition to operation on physical mechanisms.

The operation unit 103 typically includes a release button, menu display button, arrow keys, decision/execution button, and shooting mode setting dial.

The controller 130 detects the operation of the operation unit 103 and controls the respective units so as to implement operations corresponding to detected operation contents. Note that the controller 130 displays a GUI screen such as a menu screen on a display unit 111 or displays setting information, shooting information, and the like of the digital still camera 100 on the display unit 111 upon superimposing them on the display image output from the image processing unit 106.

FIG. 2B shows an example of the detailed functional arrangement of the image processing unit 106. A noise removal unit (NR) 211 applies noise removal processing to a white balance adjusted image signal. The chrominance signals and luminance signal of the image signal output from the noise removal unit 211 are concurrently processed. In a color processing unit constituted by blocks 212 to 217, the first matrix (MTX 1) 212 converts the image signal (RGB) output from the noise removal unit 211 into a YUV signal. In this case, the first matrix 212 also performs matrix conversion to absorb variations due to the inherent spectral characteristics of the image sensor (CMOS) 202. The color suppression unit 213 suppresses the color component of a high luminance portion and inhibits coloring of a saturated portion (white portion) by applying a gain corresponding to a luminance to a color (UV) signal. The color suppression unit 213 reduces the value of a color component by applying a gain smaller than 1 to a high luminance portion. In this embodiment, the controller 130 sets the relationship between luminances and gains to be applied.

The second matrix (MTX 2) 214 converts the YUV signal including the UV signal processed by the color suppression unit 213 into an RGB signal for γ processing. The Cγ processing unit 215 performs γ processing for the image signal (RGB signal) obtained by the second matrix 214. The third matrix 216 converts the output (RGB signal) from the Cγ processing unit 215 into a YUV signal again. The knee correction unit 217 receives the UV signal of the YUV signal output from the third matrix 216 and compresses a high-saturation color space to make the image signal fall within a target color space.

On the other hand, the luminance processing unit constituted by blocks 221 to 223 receives the G component of the image signal (RGB signal) output from the noise removal unit 211. In the luminance processing unit, first of all, the adaption processing unit 221 generates a Y signal by performing adaption processing for a G signal to maintain a band. The Yγ processing unit 222 performs γ processing for the Y signal generated by the adaption processing unit 221. In addition, the output from the adaption processing unit 221 is supplied to the sharpness unit 223. The sharpness unit 223 detects a sharpness amount from the input Y signal and adds it to the output from the Yγ processing unit 222.

When converting an input level into a tone value by applying a gamma curve as nonlinear input-output characteristics including Log gamma, the controller 130 sets gamma characteristics (input-output characteristics) to be used by the Cγ processing unit 215 and the Yγ processing unit 222. As described above, Log gamma means nonlinear input-output characteristics with which an output value logarithmically increases with a linear increase in input value. That is, Log gamma is input-output characteristics represented by the following logarithmic equation:

$$\text{output value}=A\times\log_{10}(\text{input value}+B)+C$$

where A, B, and C are constants.

A first lookup table (LUT 1) 218 receives the output signal (U, V) obtained by the color processing unit, which is output from the knee correction unit 217, and the output signal (Y) from the luminance processing unit, which is the sum of outputs from the Yγ processing unit 222 and the sharpness unit 223. The first lookup table (LUT 1) 218 applies predetermined color space conversion and the like to these signals and outputs the resultant signal as a final YUV signal from the image processing unit 106.

Referring back to FIG. 1, a recording unit 109 performs noise removal by, for example, using the correlations between the frames of an input YUV signal first, and then generates a recording file in accordance with a preset recording file format, together with additional information. The recording unit 109 then records the image file on a recording medium such as a memory card or hard disk.

An external output unit 110 generates a signal for outputting an image to the outside. In this case, the external output unit 110 generates a signal for external output via HDMI® (High-Definition Multimedia Interface). However, the external output unit 110 may generate a signal conforming to other specifications. The external output unit 110 may convert a resolution as needed. When, for example, outputting a signal from HDMI, the external output unit 110 converts the resolution into any one of the resolutions specified by the HDMI specification (for example, 1920×1080 pixels or 1280×720 pixels).

The display unit 111 generates a display image and causes the display device (the LCD provided on the rear surface of the digital still camera 100 in this case) of the digital still camera 100 to display the image. The display unit 111 converts the resolution of an image into a resolution supported by the display device, applies a LUT for tone correction to the image as needed, and supplies the resultant image to the display device. In this case, it is necessary to apply the LUT when monitoring the image obtained by movie shooting while applying Log gamma or when playing back a moving image shot by applying Log gamma. As described above, if the moving image shot by applying Log gamma is directly displayed, the shooting result cannot be properly evaluated. For this reason, the display unit displays the image upon applying the LUT for converting logarithmic input-output characteristics into linear input-output characteristics. Such a LUT is sometimes called a viewing LUT. The viewing LUT is not applied to a case of using a gamma curve other than the Log gamma.

In this embodiment, the controller 130 uses the same gamma characteristics (input-output characteristics) used in the Cγ processing unit 215 and the Yγ processing unit 222 regardless of the shooting sensitivity, and changes the input ranges of the Cγ processing unit 215 and Yγ processing unit 222 in accordance with the shooting sensitivity. This implements good tone gradation for the shooting results obtained at various sensitivities while reducing the capacity for storing gamma characteristics.

More specifically, first of all, the lowest shooting sensitivity that allows to ensure a predetermined dynamic range is set as a standard sensitivity. If a shooting sensitivity less than the standard sensitivity is set, the apparatus performs shooting operation with the same image sensor sensitivity as that set when the standard sensitivity is set, and then compresses the range of signal values by performing linear conversion corresponding to the shooting sensitivity (performing linear conversion so as to reduce the maximum value).

In this case, the dynamic range indicates the maximum input luminance in reflectance ratio [%] with which tone gradation is held when exposure conditions are set such that gray with a reflectance ratio of 18% corresponds to correct exposure. If, for example, it is possible to maintain tone gradation up to a reflectance ratio of 720%, the dynamic range is 720%. In addition, since changing the aperture by one step will double the amount of light, a dynamic range is sometimes expressed by the number of aperture steps. In this case, since 720/18=40, the dynamic range can be expressed as $\log_2 40\approx 5.3$ [step]. If the shooting sensitivity becomes less than the standard sensitivity, the dynamic range decreases with a decrease in shooting sensitivity.

Figure 4:
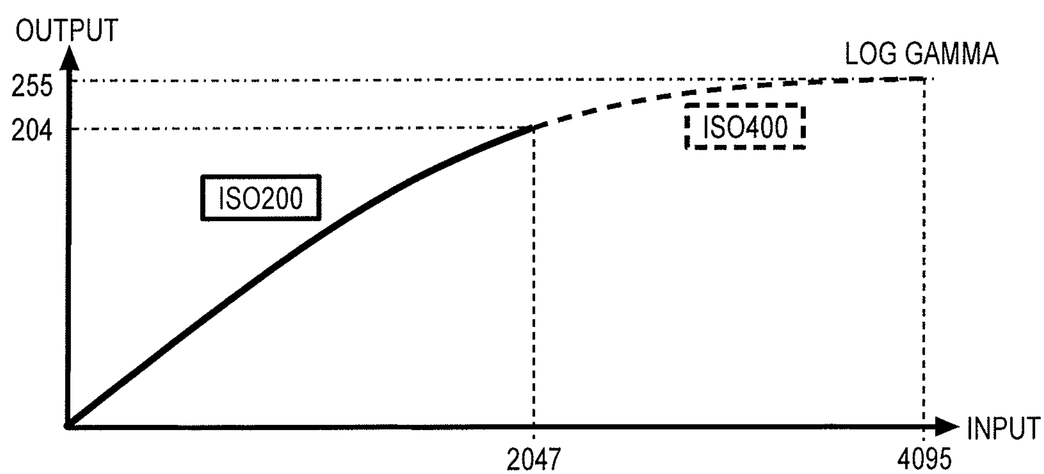
FIG. 4 is a graph showing an example of a gamma curve used in the digital camera according to the first embodiment of the present invention.

FIG. 4 shows an example of Log gamma. Assume that in this case, the A/D converter 204 is a 12-bit A/D converter, the standard sensitivity is ISO400, and nonlinear conversion (gamma conversion) output is 8 bits. That is, Log gamma in FIG. 4 can allocate input levels (pixel signal values) of 0 to 4,095 to output levels (tones) of 0 to 255. The case in FIG. 4 is premised on conversion to tones at so-called video level (16 to 255), and hence the minimum output value is not 0. It is, however, possible to use a gamma curve with a minimum output value of 0.

In this embodiment, when using Log gamma, the apparatus performs shooting operation with an image sensor sensitivity less than the shooting sensitivity by two steps to ensure a dynamic range by suppressing saturation. However, the operation of setting the image sensor sensitivity less than the shooting sensitivity by two steps is merely an example. That is, if the standard sensitivity is ISO400 and the minimum sensitivity (corresponding to a sensor gain of 1) of the image sensor is ISO100, image sensor sensitivities are set as follows at the time of shooting operation with shooting sensitivities ISO800 to ISO100.

| Shooting Sensitivity [ISO] | Image Sensor Sensitivity [ISO] | |
|---|---|---|
| 800 | 200 | |
| 400 | 100 | ← standard sensitivity |
| 320 | 100 | |
| 250 | 100 | |
| 200 | 100 | |
| 160 | 100 | |
| 125 | 100 | |

-continued

| Shooting Sensitivity [ISO] | Image Sensor Sensitivity [ISO] |
|---|---|
| 100 | 100 |

If a shooting sensitivity less than ISO400 which is the standard sensitivity is set, the apparatus performs shooting operation with an image sensor sensitivity set when the shooting sensitivity is the standard sensitivity. As will be described later, the apparatus converts the range of signal levels into a range having a smaller maximum value as the shooting sensitivity becomes less by linear conversion in the variable amplification circuit 207.

Figure 3:
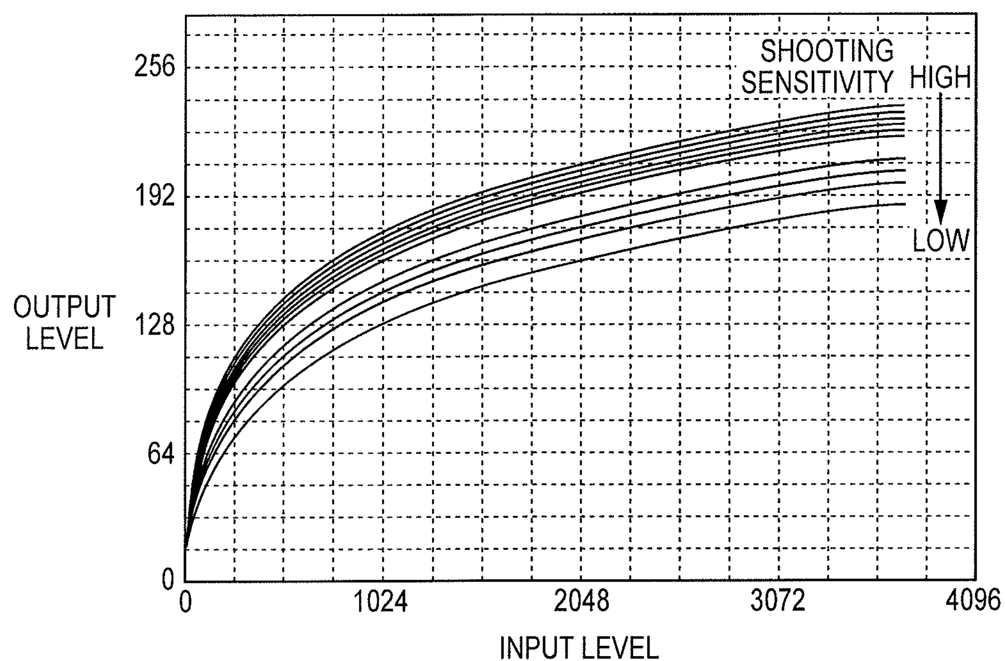
FIG. 3 is a graph showing an example of a gamma curve prepared for each sensitivity.

FIG. 3 indicates that the range of values after gamma conversion is made to correspond to a shooting sensitivity by using a gamma curve prepared for each shooting sensitivity in gamma conversion at the time of performing shooting operation with the same image sensor sensitivity regardless of the shooting sensitivity. That is, even if the input level remains the same, when the shooting sensitivity is low, the apparatus uses a gamma curve for each sensitivity so as to convert the sensitivity into a low value. In contrast to this, although the apparatus uses the same gamma curve at the time of shooting operation with a sensitivity higher than the standard sensitivity and at the time of shooting operation with a sensitivity less than the standard sensitivity, the range of input levels (input range) to which the gamma curve is applied is made to change. More specifically, if a shooting sensitivity less than the standard sensitivity is set, the apparatus performs shooting operation with a shooting sensitivity corresponding to the standard sensitivity and performs linear conversion by using a gain corresponding to the shooting sensitivity so as to compress the range of the signal levels of an shooting result, thereby controlling the input range at the time of gamma conversion.

Figure 5:
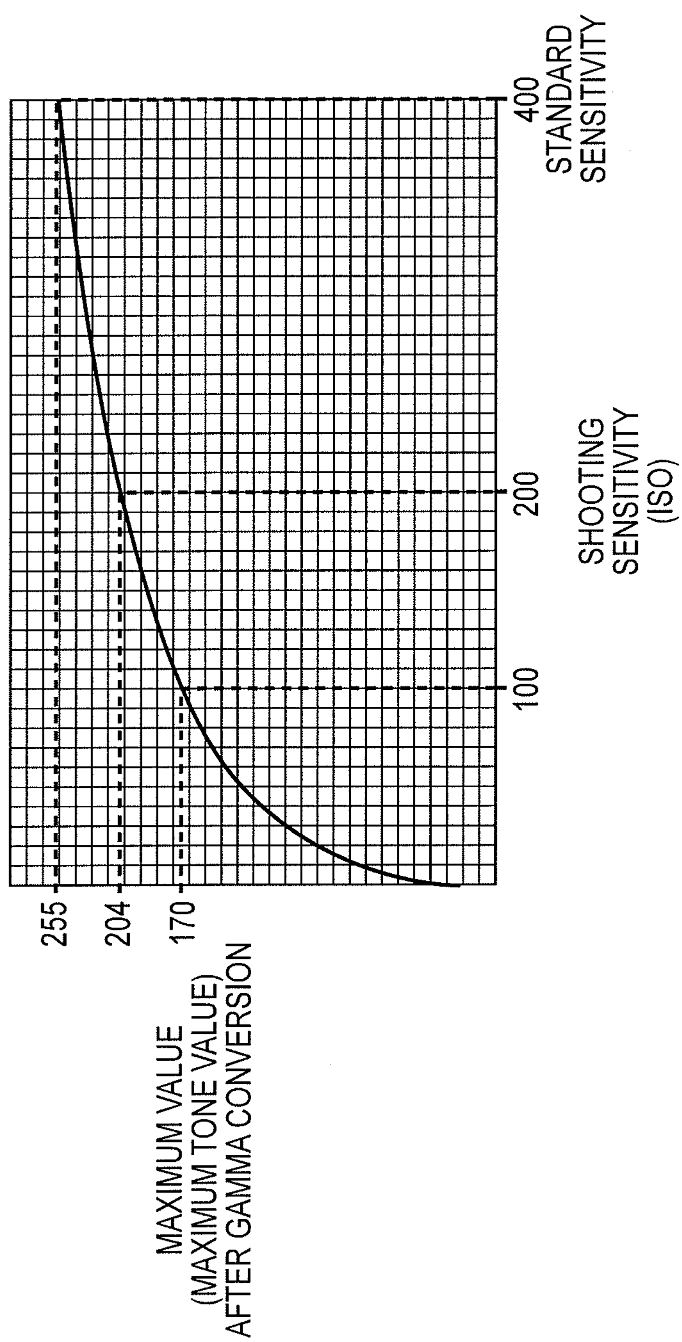
FIG. 5 is a graph showing an example of the correspondence between shooting sensitivities and maximum values after gamma conversion in the first embodiment of the present invention.

FIG. 5 shows an example of the relationship between shooting sensitivities and maximum output values after gamma conversion in this embodiment. When a shooting sensitivity is equal to the standard sensitivity (or equal to or more than the standard sensitivity), the apparatus linearly converts an output from the A/D converter 204 by applying the gain of the variable amplification circuit 207 so as to set an input range such that the maximum value after gamma conversion is 255, that is, the gamma curve in FIG. 4 is entirely used.

When using the entire gamma curve in FIG. 4, the apparatus can directly use the output range of the A/D converter 204, that is, 0 to 4,095. For this reason, the controller 130 makes settings in the variable amplification circuit 207 so as not to substantially perform linear conversion for an output from the A/D converter 204 (so as to apply a gain of 1.0).

If the shooting sensitivity is equal to or more than the standard sensitivity, the input ranges of the Cγ processing unit 215 and Yγ processing unit 222 are equal to the output range of the A/D converter 204. Therefore, gamma conversion converts input levels of 0 to 4,095 to output values up to a maximum value of 255.

Consider a case of setting a shooting sensitivity of ISO200 as a shooting sensitivity less than the standard sensitivity. In this case, the sensitivity less than the standard sensitivity by two steps is ISO50. However, the lowest image sensor sensitivity is ISO100. In this case, therefore, the apparatus also performs shooting operation with ISO100 which is an image sensor sensitivity corresponding to standard sensitivity ISO400.

However, since the shooting sensitivity is ISO200, the controller 130 makes settings to make the variable amplification circuit 207 apply a gain of 0.5 to an output from the A/D converter 204. This compresses the input ranges of the Cγ processing unit 215 and Yγ processing unit 222 to 0 to 2,047 with respect to the output range of 0 to 4,095 of the A/D converter 204. This can make the maximum value after gamma conversion become 204, as shown in FIG. 5. This means that the solid line portion of the gamma curve shown in FIG. 4 is used. This makes it possible to obtain the same result as that obtained by selecting a gamma curve whose maximum value after gamma conversion is less than that obtained by selecting a gamma curve used with the standard sensitivity in FIG. 3.

The controller 130 can prepare the relationship between shooting sensitivities and gains to be applied from the gamma curve (FIG. 4) used for shooting operation with a sensitivity higher than the standard sensitivity and the relationship (FIG. 5) between shooting sensitivities and corresponding maximum tone values. If the shooting sensitivity is ISO200, the controller 130 makes settings to cause the variable amplification circuit 207 to apply a gain of 0.5 to an output from the A/D converter 204.

Likewise, if the shooting sensitivity is ISO100, the controller 130 makes settings to cause the variable amplification circuit 207 to apply a gain of 0.25 to an output from the A/D converter 204. This compresses the input ranges of the Cγ processing unit 215 and Yγ processing unit 222 into 0 to 1,023. The apparatus then performs gamma conversion in the range in which the maximum value after gamma conversion becomes 170.

The following is an example of gain setting values when the standard sensitivity is ISO400.

| Shooting Sensitivity [ISO] | Image Sensor Sensitivity [ISO] | Gain |
|---|---|---|
| 800 | 200 | 1.0 |
| 400 (standard sensitivity) | 100 | 1.0 |
| 320 | 100 | 0.79 (=$2^{(-1/3)}$) |
| 250 | 100 | 0.63 (=$2^{(-2/3)}$) |
| 200 | 100 | 0.50 (=$2^{(-1)}$) |
| 160 | 100 | 0.40 (=$2^{(-4/3)}$) |
| 125 | 100 | 0.31 (=$2^{(-5/3)}$) |
| 100 | 100 | 0.25 (=$2^{(-2)}$) |

As described above, even if the shooting sensitivity is less than the standard sensitivity, it is possible to implement good tone gradation by compressing the input range for gamma conversion in accordance with the shooting sensitivity without changing the gamma conversion to be used and preparing a gamma conversion for each shooting sensitivity.

However, since an output from the A/D converter 204 is compressed with a decrease in shooting sensitivity, the smoothness of tone gradation also decreases with a decrease in sensitivity. For this reason, it is possible to greatly reduce the storage capacity even though the smoothness of tone gradation at the time of shooting operation with a low sensitivity is slightly inferior to that in the arrangement provided with a gamma curve for each shooting sensitivity.

As described above, in this embodiment, if the shooting sensitivity is less than the standard sensitivity, compressing the input ranges of the Cγ processing unit 215 and the Yγ processing unit 222 allows a common gamma curve to be applied to a plurality of shooting sensitivities. However, compressing an input range may cause coloring of a saturated (blown-out highlight) portion after white balance adjustment.

In order to suppress coloring of a saturated (blown-out highlight) portion, a conventional apparatus performs clip processing of limiting the upper limit value of signal levels having undergone white balance adjustment to a predetermined clip level and color suppression processing. FIG. 6 is a schematic view for explaining clip processing performed by the clip circuit 1021 of the WB unit 102. In FIG. 6, 6*a* schematically shows clip processing according to the prior art (in a case in which the shooting sensitivity is equal to or more than the standard sensitivity in this embodiment).

In this case, each group of three bars sequentially indicates the values of R, G, and B components of a given pixel from the left. As the value of the G component in the middle of the group reaches a sensor saturation level, that is, white balance adjustment is performed for a pixel whose level is converted into 4,095 by the A/D converter 204, the values of the R and B components sometimes become larger than the value of the G component. In this state, the saturated portion (blown-out highlight portion) is tinged with magenta. For this reason, the value of each component is limited such that a predetermined clip level is the maximum value.

Referring to 6*a* in FIG. 6, the R and B components are larger than the G component even after clip processing. This is because the color suppression unit 213 performs color suppression processing later in consideration of a gain of less than 1 to be applied to a high-luminance color component. That is, this apparatus suppresses coloring of a saturated portion by combining clip processing after WB processing and color suppression processing.

As described above, in this embodiment, when the shooting sensitivity is less than the standard sensitivity, the apparatus performs linear conversion with a gain of less than 1 in accordance with the shooting sensitivity after A/D conversion to compress the range of input signals to the image processing unit 106 (the Cγ processing unit 215 and the Yγ processing unit 222). In this case, as in the case indicated by 6*a* in FIG. 6, assume that the R, G, and B components of a pixel whose G component value is at the sensor saturation level are A/D-converted. In this case, the variable amplification circuit 207 applies a gain of less than 1 to the value of each component to make the value of the G component less than the sensor saturation level. Performing white balance adjustment and clip processing in this state greatly increases the differences between the G component and the R and B components. As a result, coloring may remain uneliminated even after color suppression processing.

For this reason, in this embodiment, as indicated by 6*b* in FIG. 6, if the shooting sensitivity is less than the standard sensitivity, the controller 130 sets less clip levels in clip processing performed by the clip circuit 1021 with decreases in shooting sensitivity.

Likewise, the controller 130 also changes the gain (color suppression gain) applied to a chrominance signal in color suppression processing by the color suppression unit 213 in accordance with the shooting sensitivity. FIG. 7 shows an example of the relationship (color suppression gain characteristics) between gains applied to color suppression processing and luminances. As the shooting sensitivity decreases, the maximum luminance of the chrominance signal applied to color suppression processing decreases. For this reason, the controller 130 changes the settings of color suppression gain characteristics so as to decrease the luminance to which the same gain is applied as the shooting sensitivity decreases.

As described above, coloring of a saturated portion is suppressed by a combination of a clip level in clip processing performed by the clip circuit 1021 in the WB unit 102 and a color suppression gain used by the color suppression unit 213. For this reason, a clip level corresponding to a shooting sensitivity and a color suppression gain are set in consideration of the mutual relationship between them.

Figure 8:
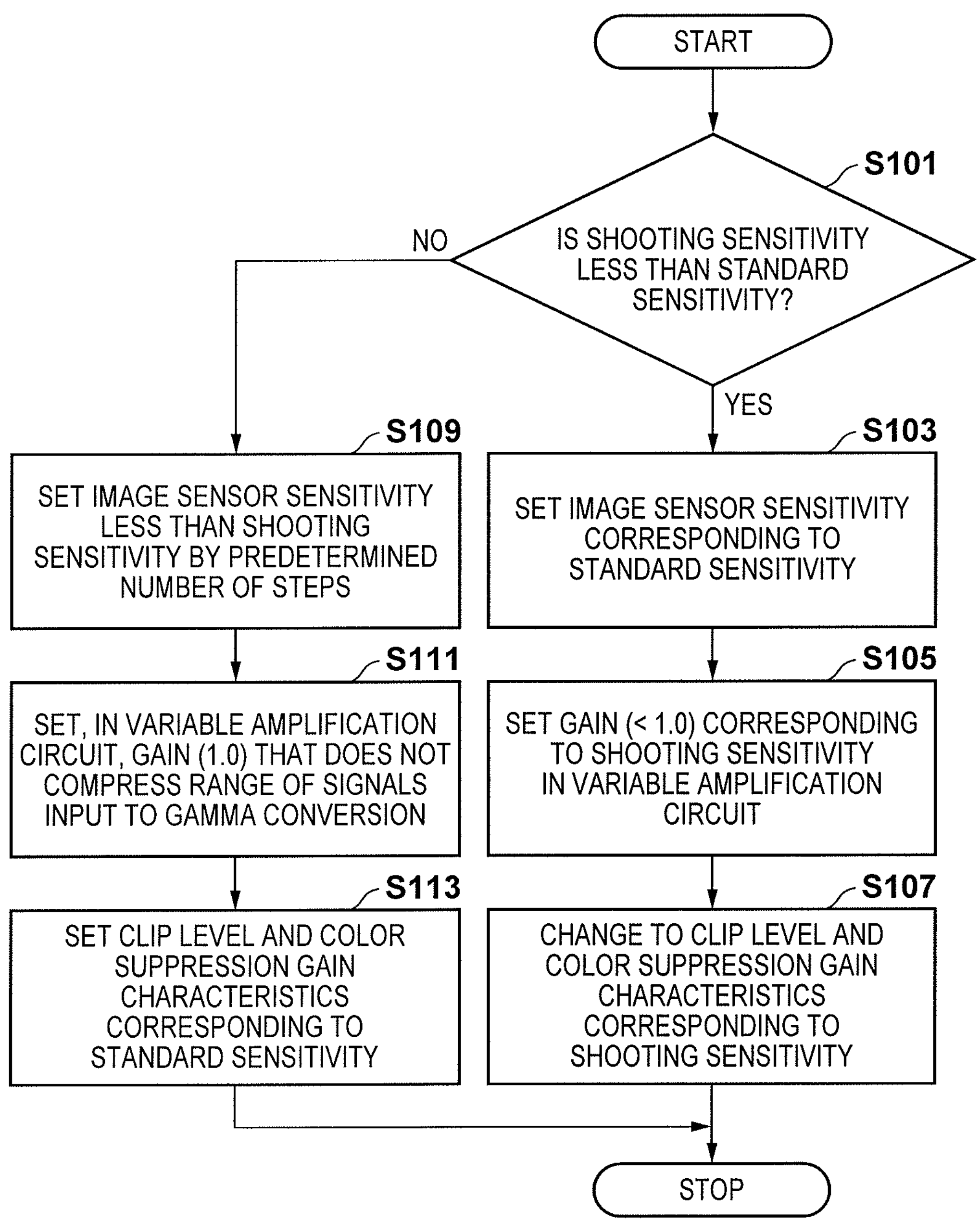
FIG. 8 is a flowchart for explaining the operation of a controller in the first embodiment of the present invention.

The operation of the controller 130 in the above embodiment will be described with reference to the flowchart shown in FIG. 8. Assume that in this case, settings have been made to use Log gamma.

In step S101, the controller 130 determines whether the set shooting sensitivity is less than the standard sensitivity. If the shooting sensitivity is less than the standard sensitivity, the controller 130 sets the image sensor sensitivity to a sensitivity corresponding to the standard sensitivity in step S103. In step S105, the controller 130 sets a gain (<1.0) corresponding to the shooting sensitivity in the variable amplification circuit 207. In step S107, the controller 130 sets a clip level corresponding to the shooting sensitivity in the clip circuit 1021 of the WB unit 102. In step S107, the controller 130 sets color suppression gain characteristics corresponding to the shooting sensitivity in the color suppression unit 213.

Upon determining in step S101 that the shooting sensitivity is equal to or more than the standard sensitivity, the controller 130 sets an image sensor sensitivity less than the shooting sensitivity by a predetermined number of steps (two steps in this embodiment) in step S109. In step S111, the controller 130 sets, in the variable amplification circuit 207, a gain that does not compress the signal range input to gamma conversion (that is, 1.0). In step S113, the controller 130 sets a clip level corresponding to the standard sensitivity in the clip circuit 1021 of the WB unit 102, and sets color suppression gain characteristics corresponding to the standard sensitivity in the color suppression unit 213.

As described above, according to this embodiment, when the shooting sensitivity is less than the standard sensitivity, it is possible to use common gamma characteristics for a plurality of shooting sensitivities including the shooting sensitivity less than the standard sensitivity by compressing the signal range input to gamma conversion processing in accordance with the shooting sensitivity. This obviates the necessity to store gamma characteristics for each shooting sensitivity, and makes it possible to handle, with a small storage capacity, a case in which many types of shooting sensitivities can be set especially as in a case of deciding shooting sensitivities by the automatic exposure function.

(Second Embodiment)

The second embodiment of the present invention will be described next with reference to FIG. 9. In this embodiment, upon performing shooting operation with a shooting sensitivity less than the standard sensitivity, the apparatus uses the processing of compressing the signal levels of the shooting result. In order to keep the temporal continuity of the tone gradation of high-luminance signals at the time of movie shooting, the apparatus preferably performs control to set a shooting sensitivity higher than the standard sensitivity.

FIG. 9 is a flowchart showing automatic exposure control operation in the aperture priority AE mode which is executed by a controller 130 of this embodiment. In step S201, the controller 130 performs automatic exposure computation based on an output signal from an image capture unit 101. In step S202, the controller 130 determines whether the shooting sensitivity computed in step S201 is less than the standard sensitivity. If the controller 130 determines that the shooting sensitivity is equal to or more than the standard sensitivity, the process shifts to step S203 to perform the processing in steps S203 to S205. The processing in steps S203 to S205 is the same as that in steps S109, S111, and S113 in FIG. 8, and hence a description of the processing will be omitted.

Upon determining in step S202 that the shooting sensitivity is less than the standard sensitivity, the controller 130 determines in step S210 whether the shutter speed is less than a threshold. It is possible to determine a threshold used in this case in consideration of the frame rate of a moving image to be recorded, shooting quality for a moving object, and the like. If, for example, the apparatus is to record a moving image at a frame rate of 30 fps, since the shutter speed needs to be 1/30 sec or less, the threshold can be set to 1/30 sec. When placing importance on the smooth expression of a moving object, the threshold may be set to a higher shutter speed (for example, 1/125 sec).

Upon determining in step S210 that the shutter speed is less than the threshold, the controller 130 decreases the shutter speed by one step and decreases the shooting sensitivity by one step in step S211. The controller 130 then returns the process to step S202 to determine the shooting sensitivity and the shutter speed again. This makes it possible to perform control to prevent the shooting sensitivity from becoming equal to or less than the standard sensitivity as much as possible.

Upon determining in step S210 that the shutter speed is equal to or more than the threshold, the controller 130 increases the shutter speed by one step and increases the shooting sensitivity by one step in step S212. The controller 130 then determines in step S213 whether the shooting sensitivity is less than the standard sensitivity. If the controller 130 determines that the shooting sensitivity is equal to or more than the standard sensitivity, the process shifts to step S203. If the controller 130 determines that the shooting sensitivity is less than the standard sensitivity, the process shifts to step S214. The processing in steps S214 to S216 is the same as that in steps S103, S105, and S107 in FIG. 8, and hence a description of the processing will be omitted.

Although the above description has been made on the case of adjusting the shutter speed and shooting sensitivity in steps in steps S211 and S212, they may be adjusted in fine steps (for example, 1/2 steps or 1/3 steps). In addition, although the above description has exemplified the automatic exposure control in the aperture priority AE mode in FIG. 9, it is possible to perform similar processing in other automatic exposure control modes such as the shutter speed priority AE mode and the program AE mode.

For example, in the shutter speed priority AE mode, the shooting sensitivity and the aperture value may be adjusted in steps S211 and S212. In the program AE mode, a program chart with a different shooting sensitivity may be selected.

Note that the above embodiment has exemplified the case of making settings to use Log gamma as an example of performing shooting operation with the same image sensor sensitivity regardless of the shooting sensitivity. Even if, however, general gamma other than Log gamma is used, shooting operation is sometimes performed with the same image sensor sensitivity regardless of the shooting sensitivity. The present invention can be applied to such a case.

The present invention is also implemented by executing the following processing. That is, this is the processing of supplying software (programs) for implementing the functions of the above embodiments to a system or apparatus via a network or various types of storage media and making the computer (or the CPU, MPU, or the like) of the system or apparatus read out and execute the software.

The present invention is not limited to the above embodiments and various changes and modifications can be made within the spirit and scope of the present invention. Therefore, to apprise the public of the scope of the present invention, the following claims are made.

This application claims priority from Japanese Patent Application No. 2012-90595 filed Apr. 11, 2012 and Japanese Patent Application No. 2013-78098 filed Apr. 3, 2013, which are hereby incorporated by reference herein in their entirety.

What is claimed is:

1. An image capture apparatus comprising:

a linear conversion unit that converts a signal level of a signal output from an image sensor with linear input-output characteristics and outputs a first converted signal;

a nonlinear conversion unit that converts the signal level of the first converted signal with nonlinear input-output characteristics and outputs a second converted signal; and a control unit that controls operation of said linear conversion unit, wherein if a shooting sensitivity is less than a standard sensitivity, the standard sensitivity being a lowest shooting sensitivity which ensures a predetermined dynamic range, said control unit controls the linear input-output characteristics so as to convert a range of signal levels, obtained by shooting operation with an image sensor sensitivity corresponding to the standard sensitivity, such that a maximum value of the range decreases with a decrease in shooting sensitivity.

2. The image capture apparatus according to claim 1, wherein said nonlinear conversion unit uses common input-output characteristics in a case in which the shooting sensitivity is not less than the standard sensitivity and a case in which the shooting sensitivity is less than the standard sensitivity.

3. The image capture apparatus according to claim 1, further comprising:

a white balance unit that applies white balance adjustment to the first converted signal; and a limiting unit that limits a maximum level of the first converted signal which has undergone the white balance adjustment, to a predetermined clip level and outputs a clipped signal, wherein if the shooting sensitivity is less than the standard sensitivity, said control unit controls the clip level to decrease with a decrease in shooting sensitivity, and wherein said nonlinear conversion unit converts a signal level of the clipped signal.

4. The image capture apparatus according to claim 3, further comprising a suppression unit that suppresses a color component of the clipped signal before the clipped signal is input to said nonlinear conversion unit, wherein if the shooting sensitivity is less than the standard sensitivity, said control unit changes a setting of color suppression gain characteristics such that a luminance to which the same gain is applied decreases with a decrease in shooting sensitivity.

5. The image capture apparatus according to claim 1, wherein the shooting sensitivity is decided by automatic exposure control.

6. The image capture apparatus according to claim 1, wherein the nonlinear input-output characteristics are input-output characteristics with which an output value logarithmically increases with a linear increase in input value.

7. A method of controlling an image capture apparatus including a linear conversion unit that converts a signal level of a signal output from an image sensor with linear input-output characteristics and outputs a first converted signal and a nonlinear conversion unit that converts the signal level of the first converted signal with nonlinear input-output characteristics and outputs a second converted signal, the method comprising:

a control step of, if a shooting sensitivity is less than a standard sensitivity, the standard sensitivity being a lowest shooting sensitivity which ensures a predetermined dynamic range, said control unit controls the linear input-output characteristics so as to convert a range of signal levels, obtained by shooting operation with an image sensor sensitivity corresponding to the standard sensitivity, such that a maximum value of the range decreases with a decrease in shooting sensitivity.

* * * * *